(12) United States Patent
Van Camp et al.

(10) Patent No.: US 7,905,941 B2
(45) Date of Patent: Mar. 15, 2011

(54) RECOVERY OF NON-FERROUS METALS FROM BY-PRODUCTS OF THE ZINC AND LEAD INDUSTRY USING ELECTRIC SMELTING WITH SUBMERGED PLASMA

(75) Inventors: Maurits Van Camp, Mortsel (BE); Peter Verguts, Herselt (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 12/447,930

(22) PCT Filed: Oct. 18, 2007

(86) PCT No.: PCT/EP2007/009023
§ 371 (c)(1),
(2), (4) Date: Jun. 9, 2009

(87) PCT Pub. No.: WO2008/052661
PCT Pub. Date: May 8, 2008

(65) Prior Publication Data
US 2010/0050814 A1    Mar. 4, 2010

Related U.S. Application Data

(60) Provisional application No. 60/856,821, filed on Nov. 6, 2006.

(30) Foreign Application Priority Data

Nov. 2, 2006    (EP) .................................... 06022807

(51) Int. Cl.
*C22B 7/00*    (2006.01)
(52) U.S. Cl. ....... 75/10.19; 75/10.22; 75/10.3; 75/10.45; 75/10.46

(58) Field of Classification Search .................. 75/10.19, 75/10.22, 10.46, 10.3, 10.45
See application file for complete search history.

(56) References Cited

U.S. PATENT DOCUMENTS

| 4,072,503 A * | 2/1978 | Peterson et al. ................ 75/10.3 |
| 4,487,628 A * | 12/1984 | Bjo/rling ...................... 75/10.22 |
| 2007/0095169 A1* | 5/2007 | Van Camp et al. ............. 75/631 |

FOREIGN PATENT DOCUMENTS

| GB | 2094353 | 9/1982 |
| WO | WO 2005/031014 | 4/2005 |

OTHER PUBLICATIONS

International Search Report, issued in PCT/EP2007/009023, dated Feb. 14, 2008.
International Preliminary Report on Patentability, issued in PCT/EP2007/009023, dated Feb. 11, 2009.

* cited by examiner

*Primary Examiner* — George Wyszomierski
*Assistant Examiner* — Tima M McGuthry-Banks
(74) *Attorney, Agent, or Firm* — Brinks, Hofer, Gilson & Lione

(57) ABSTRACT

This invention relates to a single-step pyrometallurgical process for the recovery of non-ferrous metals from zinc bearing residues, in particular from by-products of the zinc and lead industry such as goethite and jarosite. A process for the recovery of metals from industrial Zn residues containing Zn, Fe and S is defined, wherein Zn is fumed, Fe is slagged, and S is oxidized to $SO_2$, characterized in that the Zn fuming, the Fe slagging, and the S oxidation are performed in a single step process, by smelting the residues in a furnace comprising at least one submerged plasma torch generating an oxidizing gas mixture, and by feeding a solid reducing agent to the melt. The process achieves the oxidation of S and the slagging of Fe, while simultaneously achieving the reduction and the fuming of metals such as Zn.

9 Claims, No Drawings

RECOVERY OF NON-FERROUS METALS FROM BY-PRODUCTS OF THE ZINC AND LEAD INDUSTRY USING ELECTRIC SMELTING WITH SUBMERGED PLASMA

This application is a National Stage application of International Application No. PCT/EP2007/009023, filed Oct. 18, 2007, which claims priority to European Patent Application No. 06022807.9, filed Nov. 2, 2006, and U.S. Provisional Patent Application No. 60/856,821, filed Nov. 6, 2006, the entire contents of which are hereby incorporated by reference.

This invention relates to a single-step pyrometallurgical process for the recovery of non-ferrous metals from zinc bearing residues, in particular from by-products of the zinc and lead industry such as goethite and jarosite.

With the increased understanding of the environmental impact by landfilling of heavy metal containing waste products, such as leach residues and EAF-dusts, and the increasingly strict environmental legislation, the metallurgical community strives for the development of technologies that can process these materials in an economic and environmentally friendly way. In the past, several pyrometallurgical processes have been developed and operated to process these materials. They are based on the reduction and volatilization of heavy metals in a high temperature smelt. A short overview of the existing processes is given next.

The Waelz process is probably the most widely used process for the treatment of EAF-dusts and zinc leach residues. A dried mixture of residue, coke and fluxes is fed to a large rotary kiln and heated to 1200-1300° C. The zinc ferrites are decomposed, and volatile species such as Zn and PbS are fumed. The fumes are reoxidized above the bath to form solid particles that can be filtered from the off-gases. The recovered ZnO particles can for example be used as a substitute for the calcine in a hydrometallurgical Zn flow sheet. However, the rotary kiln that is used in the Waelz process is a large installation with high investment and operating costs. Moreover, the energy efficiency it rather low and the coke consumption high.

Another approach to process heavy metal containing residues is the shaft furnace technology. Although rarely used nowadays, it is still widely applied in Japan. As with the Waelz process, the residue has to be dried and mixed with fluxes; an additional briquetting operation is moreover required. High amounts of lump coke are added as a reducing agent and heat source. Similar to other zinc fuming processes, the heavy metals are fumed and post-combusted. Separate matte and slag phases are produced, but the matte phase is strongly diluted with iron, leading to large amounts of matte with relatively low concentrations of valuable metals such as Cu and precious metals. The ZnO fumes can be treated as in the Waelz process.

Coke packed bed reactors such as in the SKF Plasmadust® process are a third option to treat zinc containing residues and EAF dusts in particular. In this process, an oxidic waste is injected in powdered form through tuyeres in the lower part of the furnace, together with powdered coal and slag formers. Energy is provided by plasma torches connected to the tuyeres. The rising gases containing the zinc fumes are further reduced and cooled in the packed coke bed and the zinc is recovered in a splash condenser. The high energetic needs make the process only economically viable in regions with cheap electricity. Another major drawback is that the feed material has to be injected through the tuyeres in powdered form.

Lead blast furnace slags are normally treated in conventional batch slag fuming operations. The process is carried out in water-cooled jackets and involves the injection of fine pulverized coal and air through tuyeres into the molten slag. Zinc, lead and some other elements are fumed from the slag and reoxidized above the bath to generate oxide particles that are captured in the filter.

A top-blowing submerged lance furnace (Isasmelt® or Ausmelt®) can also be used to treat zinc containing waste products. Dried residue, coal and fluxes are fed into a first submerged lance furnace, the smelting furnace, to remove part of the zinc and lead from the slag and to remove sulfur. The molten slag continuously overflows into a second submerged lance furnace, the fuming furnace, to adequately remove zinc and lead from the slag to levels down to 3%. An even lower amount of zinc in the slag is feasible, but coupled with significantly increased operating costs. The amount of coal needed is very high. The need for two furnaces furthermore increases investment costs considerably.

Various processes that use electrical power have also been developed to process zinc containing residues. In slag resistance furnaces, the feed is injected in the molten bath from the top. The slag itself is heated by electrical conduction. Electromagnetic stirring keeps the bath homogeneous. Addition of reducing agents causes the fuming of zinc from the slag, the zinc being recovered in its metallic form after condensation.

A last method of treating zinc containing residues is by using DC arc furnaces in which heat is generated by a transferred electric arc from an electrode to the bath. The Enviroplas® process for example treats lead blast furnace slag, EAF dusts, and neutral leach residues. A reducing agent such as metallurgical coal, charcoal or other carbonaceous material low in moisture and volatiles is again employed for reducing and volatilizing zinc and lead. The high tapping temperature of about 1450° C. insures low residual zinc concentrations in the slag, but also causes the refractory lining to degrade rapidly.

The aforementioned processes all suffer from one or more of the following drawbacks:

Need for a specific feed preparation such as drying, grinding, halogen removal, briquetting;

Low fuming rates when operated at relatively low temperatures;

Fast refractory lining degradation when operated at high temperatures;

Low matte grade;

Multiple unit operations necessary;

High energy consumption;

Generation of considerable amounts of $CO_2$;

High investment and/or operating costs.

A novel process is proposed, which overcomes most of the above drawbacks. The process requires only a single step, combining an oxidizing submerged-plasma flame with an addition of a solid reductant to the top of the slag.

The invented process for the recovery of metals from industrial Zn residues containing Zn, Fe and S, wherein Zn is fumed, Fe is slagged, and S is oxidized to $SO_2$, is characterized in that the Zn fuming, the Fe slagging, and the S oxidation are performed in a single step process, by smelting said residues in a furnace comprising at least one submerged plasma torch generating an oxidizing gas mixture, and by feeding a solid reducing agent to the melt.

At least one submerged plasma torch is preferably of the non-transferred type, whereby the oxidizing gas mixture is injected into the slag phase.

It is useful to adapt the amount of free oxygen in the oxidizing gas mixture to the stoichiometric needs for the oxidation of at least the major part of S and Fe, and the amount of solid reducing agent to the stoichiometric needs for the reduction of at least the major part of Zn.

In a preferred embodiment, the oxidizing gas mixture is generated by feeding a mixture of air and a gaseous hydrocarbon to the plasma torch.

The process is particularly useful for treating industrial Zn residues contain In and/or Ge, leading to the valorization by fuming of these metals. It is also specially adapted for treating goethite.

The process is most useful when Cu is present in the industrial Zn residues and/or in the solid reducing agent. Adapting the oxidizing gas mixture in a way known to the man of the art, leads to the formation of a Cu matte phase that preferably contains more than 40 wt. %, or, more preferably, more than 50 wt. % Cu.

A process using the submerged plasma technology was already mentioned in EP1670960, which's content is incorporated here by reference in its entirety.

In a submerged plasma reactor, one or more non-transferred DC plasma torches are used as a high intensity heat source. During start-up, the reactor is filled with slag, which is molten down by the plasma tuyeres until these are submerged. During the process, the plasma is continuously generated in the slag layer. The bubbles created by the plasma gas injection create a highly turbulent bath. The feed is entered from the top and needs no preparation whatsoever: wet feed material is perfectly acceptable. The furnace furthermore makes use of the freeze lining concept: the furnace walls are water cooled and the splashing slag solidifies on the walls, creating an isolating crust that reduces the heat losses. The slag composition is chosen in such a way that the process can be operated at high temperatures with a thick freeze lining, meaning that the liquidus temperature of the slag should be high to avoid excessive overheating of the slag. The high operating temperatures allow for fast fuming rates without the problem of refractory brick degradation.

Solid reducing agents such as coal, cokes, electronic scraps, or automobile shredder residue are added to the feed, or reductants such as natural gas, LPG or oil are fed through the tuyeres. Just as for all the other processes mentioned before, it is generally accepted, and moreover dictated by thermodynamics, that only a reducing environment can be used to attain high yields of zinc fuming. Known processes however yield a Cu matte of inferior quality, containing an excess of Fe and sulfur.

It was now discovered that oxidizing gas fed through a submerged plasma torch only marginally affects the zinc fuming rate. Unexpectedly, this allows for the use of plasma gas that is sufficiently oxidizing to remove most of the sulfur, and thus to generate a high matte grade, without affecting the high fuming rates that normally require a reducing atmosphere. Although this is contradictory to what thermodynamics predict, it is assumed that this way of operating causes different local thermodynamic zones, which are reducing in the neighborhood of the solid reductants but oxidizing in the neighborhood of the bubbles. These clearly differentiated zones apparently can coexist in one single furnace. As a result, the process succeeds in attaining high fuming rates, generating a high grade matte and a clean, discardable slag. The discovery opens up an additional degree of freedom in running the process: the amount of excess oxygen in the plasma flame can be freely tuned, providing only the necessary amount of excess oxygen needed to reach the intended phase compositions. This can be realized by using a mixture of air and a limited amount of a reducing agent such as methane or any other hydrocarbon compound.

The desired phase compositions typically depend on the composition of the feed materials. When a considerable amount of copper is present in the feed, a high grade matte is normally desired: care must then be taken not to over-oxidize and thereby convert the matte. The addition of methane to the plasma gas is in these conditions useful to limit the amount of free oxygen. When the feed contains e.g. metallic iron, it might be preferred to oxidize it in the process, the required oxygen being then mainly provided by the plasma flame. No methane will be added in this case.

Another beneficial result from processing goethite or other zinc residues with this technology is that, besides Zn, elements like In and Ge are fumed. They can be valorized in later processing steps. Precious group metals that are typically present in small amounts in the zinc residues will be retrieved in the matte and the fumes. Other products such as paragoethiet, jarosite and leaching residues can also suitable be processed.

The process is further illustrated with the following Examples.

COMPARATIVE EXAMPLE

A starting smelt is created by melting a mix of a lead blast furnace (LBF) slag and a recycled slag from earlier tests. Goethite is then fed to the bath, along with plastic scraps as solid reductants. A neutral plasma gas is used, delivering 100 m$^3$/h of air, 10 m$^3$/h of methane and 16 m$^3$/h of nitrogen as swirling gas. The process is carried out as described above. Table 1 shows the composition and amounts of the feed and output materials. Although the test resulted in very low zinc concentration in the produced slag, the matte grade is low.

TABLE 1

Compositions (wt. %) and amounts of feed and output materials using a neutral plasma gas

| | Pb | Cu | Zn | Fe | S | CaO | SiO2 | Amount (kg) |
|---|---|---|---|---|---|---|---|---|
| Input | | | | | | | | |
| LBF-slag | 1.05 | 0.49 | 5.15 | 21.55 | 2.09 | 21.30 | 25.05 | 100 |
| Recycled-slag | 0.45 | 2.15 | 0.65 | 32.30 | 5.80 | 16.50 | 18.50 | 300 |
| Goethite | 4.12 | 1.30 | 12.53 | 29.01 | 8.20 | 3.91 | 5.28 | 379 |
| Plastic scraps | 0.09 | 4.52 | 0.1 | 0.65 | — | 1.68 | 3.99 | 144 |
| Output | | | | | | | | |
| Flue dusts | 17.53 | 0.90 | 32.91 | 3.63 | 3.70 | 9.01 | 0.10 | 100 |
| Matte | 0.38 | 22.00 | 1.15 | 52.50 | 19.18 | 2.63 | 1.69 | 50 |
| Slag | 0.08 | 0.89 | 1.05 | 30.40 | 2.34 | 16.12 | 19.03 | 500 |

EXAMPLE ACCORDING TO THE INVENTION

A similar test was carried out, this time with an oxidizing plasma gas delivering 100 m$^3$/h of air and 16 m$^3$/h of nitrogen as swirling gas. No methane was injected. Table 2 shows the composition and amounts of the feed and output materials. It is clear that in this case the resultant slag only contains slightly more Zn, while a much higher matte grade is attained. This is further reflected in the lower amount of produced matte compared to the amount of the feed.

Illustration of the enrichment of In in the fumes is also demonstrated: Table 2 shows the fuming of Indium, resulting in In enriched flue dusts. Fumed In can economically be recovered in further processing steps. A similar valorization can optionally be performed for Ge. Ag, together with other precious metals, is retrieved in the matte and in the flue dusts. It can be valorized using known methods.

TABLE 2

Compositions (wt. %) and amounts of feed and output materials using an oxidizing plasma gas

|  | Pb | Cu | Zn | Fe | S | CaO | SiO2 | In (ppm) | Ag (ppm) | Amount (kg) |
|---|---|---|---|---|---|---|---|---|---|---|
| Input |  |  |  |  |  |  |  |  |  |  |
| LBF-slag | 1.05 | 0.49 | 5.15 | 21.55 | 2.09 | 21.30 | 25.05 | — | — | 200 |
| Goethite | 4.12 | 1.3 | 12.53 | 29.01 | 8.20 | 3.91 | 5.28 | 400 | 131 | 1232 |
| Plastic scraps | 0.09 | 4.52 | 0.1 | 0.65 | — | 1.68 | 3.99 | — | — | 468 |
| Output |  |  |  |  |  |  |  |  |  |  |
| Flue dusts | 13.00 | 1.00 | 35.43 | 9.26 | 3.64 | 1.63 | 0.76 | 1314 | 372 | 400 |
| Matte | 0.38 | 59.20 | 1.15 | 14.00 | 20.50 | 2.30 | 1.69 | 542 | 581 | 40 |
| Slag | 0.15 | 1.38 | 2.06 | 43.00 | 0.70 | 14.00 | 20.00 | 16 | 17.1 | 658 |

The invention claimed is:

1. A process for the recovery of metals from industrial Zn residues containing Zn, Fe and S, wherein Zn is fumed, Fe is slagged, and S is oxidized to $SO_2$, in a single step process comprising smelting said residues in a furnace containing a melt of said residues, wherein the furnace comprises at least one submerged plasma torch generating an oxidizing gas mixture, and feeding a solid reducing agent to the top of the slag.

2. The process of claim 1, wherein the at least one submerged plasma torch is of the non-transferred type and wherein the oxidizing gas mixture is injected into a slag phase.

3. The process of claim 1, wherein the amount of free oxygen in the oxidizing gas mixture is adapted to the stoichiometric needs for the oxidation of at least the major part of S and Fe, and the amount of solid reducing agent is adapted to the stoichiometric needs for the reduction of at least the major part of Zn.

4. The process of claim 1, wherein the oxidizing gas mixture is generated by feeding the at least one submerged plasma torch with a mixture of air and a gaseous hydrocarbon.

5. The process of claim 1, wherein the industrial Zn residues contain In and/or Ge, which are valorized by fuming of these metals.

6. The process of claim 1, wherein the industrial Zn residue is goethite.

7. The process of claim 1, wherein the industrial Zn residues or the solid reducing agent contains Cu, leading to the formation of a Cu matte phase.

8. The process of claim 7, wherein the oxidizing gas mixture is adapted to obtain a Cu matte containing more than 40 wt. % Cu.

9. The process of claim 1, wherein the oxidizing gas phase is adapted to obtain a matte containing less than 15 wt. % Fe.

\* \* \* \* \*